United States Patent Office 3,681,012
Patented Aug. 1, 1972

3,681,012
PROCESS FOR MAKING ALUMINA
Frederick J. Sibert, Chicago, Ill., assignor to Nalco Chemical Company, Chicago, Ill.
No Drawing. Continuation-in-part of application Ser. No. 537,011, Mar. 24, 1966, which is a continuation-in-part of application Ser. No. 452,373, Apr. 30, 1965, now Patent No. 3,390,959, dated July 2, 1968. This application June 17, 1969, Ser. No. 834,132
Int. Cl. C01f 7/06
U.S. Cl. 23—143
3 Claims

ABSTRACT OF THE DISCLOSURE

Red mud is removed from aqueous caustic solutions of alumina by using as a coagulation treatment starch plus certain acrylic acid polymers.

---

This application is a continuation-in-part of application Ser. No. 537,011, filed Mar. 24, 1966, and now abandoned, which is in turn a continuation-in-part of application Ser. No. 452,373, filed Apr. 30, 1965, which has issued on July 2, 1968 as U.S. Pat. 3,390,959.

INTRODUCTION

The almost universally used process for the manufacture of alumina is the Bayer process. In its broadest aspects, this method is carried out almost exclusively in aqueous solution, and is achieved by reaction of bauxite and a strong base such as caustic soda or lime in steam-heated autoclaves whereby the alumina is transformed into a soluble aluminate form. In this step, a considerable amount of insoluble impurities results or is released from the bauxite, which recrement must be separated from the desired alumina constituent. These residues commonly known as red muds include iron oxides, sodium aluminosilicate, titanium oxide and other materials. Generally these muds appear as very fine particles which are difficult to separate out. Yet the red muds which usually constitute about 5–30% by weight of the ore must be rapidly and cleanly separated from the solubilized alumina liquor in order to make this particular step economically efficient. If the rate of separation is too slow, output is materially diminished and overall process efficiency impaired. Likewise, if the separation is not clean, the resultant alumina in the form of aluminate is somewhat crude and undesirable for a number of end-uses. The insoluble impurities present in the alumina as carry-through from the manufacturing process tend to add extraneous non-active matter into the specific media, such as water, being treated with aluminate for a variety of purposes. For example, low grade sodium aluminate containing relatively large amounts of mud impurities when used to treat water results in a situation of increased tendency to form slime masses as the direct result of the insoluble impurities present, which masses tend to foul feeding equipment. Also, if the crude sodium aluminate contains substantial amounts of impurities as an admixture, solution problems are quite difficult to overcome if the aluminate is fed in the form of a solid.

One method of overcoming the above problems, and materially speeding up separation of red muds from alumina as well as effecting a cleaner separation of the constituents is disclosed in my U.S. Pat. 3,390,959. While the additives disclosed therein greatly aid in increasing the efficiency of the settling step, it would be of benefit if even a more efficient treatment was available.

OBJECTS

It, therefore, becomes an object of the invention to provide an improved method of producing alumina.

A specific object of the invention is to effect an efficient separation of solubilized alumina from red mud impurities resulting from prior digestion of bauxite ore in the Bayer process by addition of a combination of specific chemical agents.

Other objects will appear hereinafter.

INVENTION

In accordance with the invention, an improvement has been discovered in the Bayer process of preparing alumina from bauxite. The Bayer process broadly includes the steps of digesting bauxite in aqueous solution and at elevated temperatures, usually under steam pressure with a strongly basic substance to solubilize the alumina contained in the ore. The alumina liquor is then separated from the water-insoluble impurities of the bauxite ore which are the water-insoluble residues that remain after reaction between the bauxite ore and basic material used to digest the ore. The impurities include materials originally present in the ore as well as insoluble reaction products from the digestion step. The aluminate liquor is then filtered and alumina in relatively pure form precipitated from the filtrate as a trihydrate solid. The remaining liquid phase or spent liquor is returned to the intial digestion step and employed as a digestant of additional ore after being reconstituted with additional base. Generally, liquor entrapped with the red muds is lixiviated therefrom with water and the resultant liquor also reused.

The above-discussed impurities generically referred to as red muds, should be separated from the aluminate liquor at a relatively fast rate to make the overall Bayer process efficient. Also, the separation itself should be clean and complete with but minimal amounts of red mud residue remaining as a dispersed phase in the solubilized alumina liquor.

In the above-discussed process, the improvement forming the basis of the invention lies in addition to the digested bauxite containing solubilized alumina and impurities of a combination of starch and certain organic polymeric substances. This treatment substantially enhances the rate of separation of dispersed red muds from solubilized alumina or aluminate salts.

As to the first component of the treatment, the invention is quite specific with respect to the type of polymer necessary to effect the improved separation rate. It has been determined that the type of ameliorating additive polymer should contain at least 80% or reoccurring moieties selected from either acrylic acid or salts of acrylic acid. Thus, the separation aid may either be a homopolymer comprising polyacrylic acid or salts of polyacrylic acid, or a copolymer, or terpolymer or higher multi-component polymer wherein at least 80% of the polymer structure is made up of acrylic acid or acrylic acid salt groups. The polyacrylate salt may be either an alkali metal, alkaline earth metal or ammonium salt. Thus, the polymer may be a polyacrylate, such as the polyacrylic acid, and the salts thereof.

Besides the homopolymers of polyacrylic acid or polyacrylate salts, another preferred species is a water-soluble copolymer derived from copolymerization of a monomer mixture containing 80–99% by weight of acrylic acid or acrylate salt, and most preferably, alkali metal acrylate salt and 1–20% by weight of an additional and different monomer comprising an ethylenically unsaturated polymerizable compound containing a hydrophilic group in a side chain attached to the unsaturated hydrocarbon structure.

The molecular weight of the homopolymers and copolymers of this invention is extremely critical. The coagulation activity of a polymer is directly related to its molecular weight. The activity increases as the molecular weight increases.

It has also been discovered that the high activity of the polymers of my invention is related to their characteristic of being substantially linear in nature. It is a natural tendency for branching to become more prevalent as molecular weight increases. However, less than 50% of the molecular weight of the polymers of this invention is derived from atoms existing in the branched state.

Particularly useful homopolymers or copolymers of the type described above should have a molecular weight in excess of 50,000, preferably in excess of 100,000 and most preferably at least 1,000,000. It has been discovered that extraordinarily unexpected, excellent, results are achieved with polymers having a molecular weight of at least 1,000,000.

The polymers taught by this invention which have a molecular weight of at least 1,000,000, have been discovered to produce suitable results as a flocculating agent even when used singularly. However, such results are far less than those achieved when the combined high molecular weight polymer starch combination is used.

It should be noted that the use of these high molecular weight polymers necessarily limits their concentrations in aqueous solutions. As an absolute maximum, the polymer concentration on a weight basis is about 0.5%. If such a concentration value is exceeded the viscosity of the polymer will be too great and prevent adequate distribution of the polymer in the digested bauxite ore slurry system. As a consequence the polymer could not efficiently intermix with the red mud solids and produce adequate results.

Another practical consideration revolves upon feeding the polymer into the digested bauxite ore slurry system. Polymer concentrations in excess of about 0.5% could not be pumped due to their high viscosity.

A wide variety of one or more different monomers may be copolymerized or terpolymerized in amounts up to about 20% with acrylic acid or salts thereof. Typical comonomers include acrylamide, methacrylamide, acrylonitrile, the lower alkyl esters of acrylic and methacrylic acids, vinyl methyl ether, methacrylic acid salts, maleic anhydride and salts thereof, isopropenyl acetate, itaconic acid, vinyl acetate, alpha-methyl styrene, styrene, fumaric acid, aconitic acid, citraconic acid, amides of any of the foregoing acids, alkali metal derivatives (e.g., sodium, potassium and lithium), alkaline earth metal derivatives (e.g., magnesium, calcium, barium and strontium), and ammonium salts of any of the above monomeric acids or others, the partial alkyl ester amides and salts of various polycarboxylic acids, vinyl toluene, chlorostyrene, vinyl chloride, vinyl formate, ethylene, propylene, isobutylene, etc. Of the just-mentioned comonomers, greatly preferred materials among these contain a hydrophilic group in a side chain off the ethylenically unsaturated hydrocarbon group. Those monomers which do not contain such hydrophilic solubilizing group should be used in lesser amounts of say about 1–5% by weight based on total weight of monomer present.

Still other monomeric substances which may be employed in conjunction with the acrylic acid or acrylic acid salt constituent include materials such as sulfoethyl acrylate, carboxylethyl acrylate, diethyl vinyl phosphonate, crotonic acid or salts thereof, vinyl sulfonate or salts thereof, vinyl alcohol and vinyl aryl hydrocarbons containing solubilizing groups such as sulfonates, etc.

The second component of the compositions of the invention is starch. This material is well known and needs little elaboration. Such starch materials as potato, corn, tapioca, amylose, sorghum and other readily available starches may be employed as well as synthetic starch derivatives. For best results, the combination treatment should comprise a weight ratio of starch to polymer ranging from 10:1 to 200:1. However, other weight ratios may be used, for example, a satisfactory flocculation agent consisting essentially of starch and polyacrylic acid may have a weight ratio in a proportion of from 2.65 to 196 parts by weight of starch per part by weight of polyacrylic acid, or more narrowly from about 7 parts to about 76 parts by weight per part of polyacrylic acid.

The compositions of the invention are utilized by simply adding these adminicles separately in any sequence or in combination to the digested bauxite ore containing solubilized alumina and red mud residues dispersed throughout the aluminate liquor, in an amount at least sufficient to accelerate the separation of the red mud dispersed solids from the liquid phase. Generally, for best results, at least about 0.1% by weight of combined chemical based on mud residue or insolubles should be employed. More preferably, at least 0.2% by weight of chemicals is added to the digester effluent to effect rapid separation. Most preferably, 0.2% by weight to about 10% by weight of chemical are added.

The recited 0.1% by weight dosage of combined chemical as given is based on red mud residue. This minimum value may be converted to a bauxite ore basis.

The red mud content of a bauxite ore may vary from 5 to 30% by weight. The minimum dosage of the combined chemical on an ore weight basis is naturally dependent on the percent of red mud present.

Table I given below summarizes the conversion of the minimum 0.1% by weight dosage and the 10% by weight dosage as based on red mud to a bauxite ore basis.

TABLE I

| Dosage basis | Bauxite ore containing 5% by weight red mud | | Bauxite ore containing 30% by weight red mud | |
| --- | --- | --- | --- | --- |
| | Weight percent on bauxite ore basis | Lb. combined chem./2.3 ton bauxite ore | Weight percent on bauxite ore basis | Lb. combined chem./2.3 ton bauxite ore |
| 0.1% by weight based on red mud | 0.005 | 0.23 | 0.03 | 1.4 |
| 10% by weight based on red mud | 0.5 | 23.0 | 3.0 | 140.0 |

It will be noted that from about 0.23 to about 140 pounds of combined chemical agent may be used per 2.3 tons of bauxite ore; however, other ranges may be suitable, for example, from about 0.5 to about 7.0 pounds per 2.3 tons of bauxite ore of a flocculating agent consisting essentially of starch and polyacrylic acid may be used. Stated another way from about 0.5 to about 7.0 parts per weight of flocculating agent (consisting essentially of starch and a polyacrylate) can be used per 4,600 parts by weight of bauxite ore.

It is understood, that higher amounts than the just-stated maximum may be employed without departing from the scope of the invention, although generally a point is reached in which additional amounts of chemical do not improve the separation rate over already achieved maximum rates. Thus, it is uneconomical to use excessive amounts of material when this point is reached.

EXAMPLES

The following examples illustrate both the laboratory and commercial utilization of my invention.

Example I

A Jamaican bauxite ore was ground in a Raymond mill to size 97% smaller than 50 mesh prior to digestion. The bauxite ore was then digested in a process liquor. The ore contained 38% by weight alumina ($Al_2O_3$).

The process liquor used was a Kaiser process liquor. It was a dark reddish-brown liquid. Analysis of the Kaiser liquor gave the following results:

Percent $Al_2O_3$ _____ 5.97
Percent $Na_2O$ _____ 13.5
Wt. $Al_2O_3/Na_2O$ _____ 4.4
Percent $SiO_2$ _____ 0.0688

The digestion procedure involved the mixing of 593 grams (dry basis) of bauxite ore and 5 grams of calcium hydroxide in 4750 ml. of processed liquor (digesting solution) to form a slurry. This slurry was then added to an autoclave equipped with a turbine blade stirrer (800–1000 r.p.m.). Air was displaced by pressurizing three times to 200 p.s.i. with nitrogen and subsequent venting. The contents of the autoclave were then heated to 400° F. This temperature was held for one-half hour. At the end of the one-half hour digestion period the autoclave was pressurized to 200 p.s.i. with nitrogen. The contents in the autoclave were then flashed to the atmosphere into a cyclone collector and subsequently collected in a 6 liter stainless steel beaker. The digestion effluent was then diluted with boiling distilled water to 5 liters and stored with stirring at 210° F.

In plant practice the digester contents are flashed from the high digestion pressure to atmospheric pressure in order to atomize the slurry particles and break up agglomerates. The laboratory arrangement permits a similar flashing to reproduce the fine particle size.

A starch solution having a concentration of 30 grams per liter which could subsequently be diluted was prepared in the following manner:

(1) Enough strong caustic was measured (approximately 50% NaOH) to give a caustic concentration of 50 g./l. (as $Na_2CO_3$) in the 200 ml. of starch solution during cooking.

$$\text{ml. strong caustic} = \frac{(200)(50)}{\text{conc. of strong caustic (g./l. eq. } Na_2CO_3)}$$

(2) The strong caustic was poured into a 250 ml. beaker and distilled water was then added to make the volume up to 150 ml.
(3) The solution was placed on a hot water bath and heating was started.
(4) 8.6 grams of Pearl corn starch was slurried with 25 ml. of water in a 50 ml. beaker.
(5) The starch slurry was added with stirring to the 150 ml. of caustic solution when the solution was 210° F. The 50 ml. beaker was washed with 25 ml. of water. The washings were poured into the 250 ml. beaker.
(6) The starch was cooked for 20 minutes at 210° F., and then poured into a 250 ml. volumetric flask. It was then cooled with cold water. Enough water was added to make the volume up to 250 ml. The starch solution was stored at 40° F.

The settling tests were carried out in the following manner. A 500 milliliter Pyrex graduate, with tapered top to accommodate a stopper, was marked at 1″ intervals. The graduate was preheated to 200° F. Four milliliters of a starch solution having a concentration of 30 grams per liter and containing 0.118 gram of starch were added to 500 milliliters of the prepared digested bauxite ore along with an aqueous solution containing 0.0029 gram of sodium polyacrylate having a molecular weight in excess of 1,000,000. The 0.118 gram of starch added via the 4 ml. volume corresponds to a dosage of 4 pounds per ton of bauxite ore. The 0.0029 gram of the sodium polyacrylate added corresponds to a dosage treatment of 0.1 (1/10) pound sodium polyacrylate per ton of bauxite ore.

The graduate was stoppered and inverted to mix the contents. It was then set in an oven, with a glass door, and maintained at 200° F. A stirrer rotating at 1 r.p.m. was inserted and the separation rate followed by visual measurement. Specifically the measurement was made by following the solid-liquid interface and measuring the drop of this interface in inches per minute.

After addition of the starch and sodium polyacrylate, the solid-liquid interface dropped two inches the first one minute and five seconds. It dropped another inch in a time interval of 22 seconds; another inch dropped in a time interval of 21 seconds; another inch dropped in a time interval of 20 seconds; another inch dropped in a time interval of 30 seconds; and the final inch dropped in a time interval of 38 seconds. The total time required to drop seven inches was therefore two minutes and sixteen seconds (1:05+0:22+0:21+0:20+0:30+0:38=2:16)

This figure may then be converted to a separation rate of red mud insolubles from clear liquor in terms of feet per hour.

The final volume occupied by the settled red mud was 60 ml.

Example II

The same procedure as given in Example I was followed except that digestion was conducted at 410° F. Also, a different digesting solution was used. A synthetic spent liquor was prepared according to a procedure developed by Kaiser Aluminum and Chemical Corporation. The formulation and preparation are described below:

1500 ml. distilled water
153 gms. soda ash
1368 gms. 50% NaOH
5.5 gms. 37% sodium silicate
410 gms. alumina trihydrate The soda ash was dissolved in the water with heating. The caustic was then added and the solution was heated to reflux. The sodium silicate and alumina trihydrate were then added and the system was heated under reflux until they both went into solution. The solution was then cooled, diluted to 4 liters with distilled water and stored in a plastic bottle until needed for use.

Aqueous solutions containing 0.118 gram of starch and 0.0029 gram of sodium polyacrylate respectively were added to 500 ml. of digested ore slurry. Such amounts correspond to 4 and 0.1 pound of starch and sodium polyacrylate respectively per ton of bauxite ore.

After addition of the starch and the sodium polyacrylate, the solid-liquid interface dropped 5 inches in a 30 second time interval. It dropped another inch in a time interval of 15 seconds; and dropped the final and seventh inch in 25 seconds. The total time required to drop seven inches was one minute and ten seconds.

The final volume occupied by the settled red mud was 75 ml.

Example III

The same procedure as given in Example I was followed except that digestion of the bauxite ore was conducted at about 340° F. under a pressure of 75 p.s.i.g. Also, the starch and sodium polyacrylate were added at different dosage levels.

Aqueous solutions containing 0.029 gram of starch and 0.0029 gram of sodium polyacrylate respectively were added to 500 ml. of digested ore slurry. Such amounts correspond to 1 and 0.1 pound of starch and sodium polyacrylate respectively per ton of bauxite ore.

After the addition of the starch and sodium polyacrylate the solid-liquid interface dropped one inch in a time interval of 38 seconds; another inch dropped in a time interval of 32 seconds; another inch dropped in a time interval of 28 seconds; another inch dropped in a time interval of 28 seconds; another inch dropped in a time interval of 38 seconds; and the final and seventh inch dropped in a time interval of 53 seconds. The total time required to drop seven inches was therefore four minutes and six seconds.

The final volume occupied by the settled red mud was 60 ml.

Example IV

The same procedure as given in Example I was followed except that digestion was carried out at a pressure varying between 185 and 200 p.s.i.g. and a synthetic digestion liquor, prepared in accordance with the procedure given in Example II, was used. Also, the starch and sodium polyacrylate were added at different dosage levels.

Aqueous solutions containing 0.059 gram of starch and 0.0029 gram of sodium polyacrylate respectively were added to 500 ml. of digested ore slurry. Such amounts correspond to 2 and 0.1 pound of starch and sodium polyacrylate respectively per ton of bauxite ore.

After addition of the starch and sodium polyacrylate the solid-liquid interface dropped 2 inches in a time interval of 17 seconds; another inch dropped in a time interval of 15 seconds; another inch dropped in a time interval of 17 seconds; another inch dropped in a time interval of 22 seconds; another inch dropped in a time interval of 36 seconds; and the final and seventh inch dropped in a time interval of one minute and ten seconds. The total time required to drop seven inches was therefore two minutes and fifty-seven seconds.

The final volume occupied by the settled red mud was 75 ml.

Example V

In the commercial Bayer process raw bauxite is continuously fed to a Bradford beaker. There, the ore is pulverized to a finely divided state. The pulverized ore is then fed to a slurry mixer where a 50% solids slurry is prepared using spent liquor. This bauxite slurry is then diluted and sent through three digesters (in series) where, at about 470° F. and 550 p.s.i., 98% of the total available alumina is extracted from ore containing both trihydrate and monohydrate forms. The effluent from the digesters passes through a series of nine flash tanks wherein heat and condensate are recovered as the digested slurry is cooled to about 230° F. and brought to atmospheric pressure. The aluminate liquor leaving the flashing operation contains about 3% solids and is fed to the center well of a mud settler. At this point (or just prior) sodium polyacrylate and starch solution are added to the slurry in amounts sufficient to maintain a mud settling rate of from 15 to 20 feet per hour. This amount is such that the combined weight of addition is about 0.1% as based on the weight of said impurities. The ratio of starch to sodium polyacrylate added is from 10 to 200 parts by weight. The starch-sodium polyacrylate composition is added to the bauxite slurry in the form of a dispersion. This dispersion is made up in about a 5% aqueous sodium hydroxide solution. As the red mud settles, clarified sodium aluminate solution, referred to as "green" or "pregnant" liquor, overflows a weir at the top of the mud settling tank and is passed to the subsequent process steps. The settled solids ("red mud") are withdrawn from the bottom of the mud settler and passed through a countercurrent washing circuit for recovery of sodium aluminate and caustic.

EVALUATION OF INVENTION

In order to determine the efficiency of the compositions of the invention materially enhancing rate of separation of red mud insolubles from aluminate liquor, the following test procedure was devised. This test method was devised to meet typical industrial conditions, particularly with regard to the step wherein digested effluent is treated with chemical to facilitate separation out of insolubles. In order to prepare test media, a digested ore was prepared as follows. A slurry was made of 593 grams of ore, 15 grams of calcium hydroxide and 4750 ml. of an industrial spent liquor. The spent liquor was an aqueous solution of soda ash, caustic, aluminate and sodium silicate. The above materials were added to a steam autoclave equipped with a turbine blade stirrer (800–1000 r.p.m.). Air was displaced in the autoclave by pressuring three times to 200 p.s.i. alternately with nitrogen followed by venting. The contents of the autoclave were heated to 200° C. after a warm-up time of one-half hour. An equilibrium vapor pressure of 160–200 p.s.i. was then obtained. The digestion temperature was held for one-half hour, the contents were flashed to atmosphere and the resultant digester effluent diluted with boiling water to a total volume of 6 liters. This material employed as test media was then stored with stirring at 210° F.

The separation tests were carried out in the following manner. A 500 ml. Pyrex graduate, with tapered top to accommodate a stopper, was marked at 1″ intervals. The graduate was preheated to 200° F. Ten to 20 ml. of dissolved treatment at any desired dosage level was added to the graduate, containing 500 ml. of the digestion effluent. The graduate was stoppered and inverted to mix the contents. It was then set in an oven, with a glass door, and maintained at 200° F. A stirrer rotating at 1 r.p.m. was inserted and the separation rate followed by visual measurement. Specifically, this measurement was made by following the solid-liquid interface and measuring the drop of this interface in inches per minute. This figure was then converted to a separation rate of red mud insolubles from clear liquor in terms of feet per hour. Table II below shows results obtained with a combination treatment of starch and sodium polyacrylate with respect to performance in the above-described test. In these runs, polymer addition was followed by starch treatment. Also, the molecular weights of all the polymers evaluated below are at least 1,000,000.

TABLE II

| Chemical | Dosage weight percent chemical | Starch/polymer weight ratio | Separation rate, feet/hour | | |
|---|---|---|---|---|---|
| | | | Individual use | | |
| | | | Individual results | Additive results | Combined use |
| 1. Starch | 0.3 | | 9 } | 16 | |
| 2. Sodium polyacrylate | 0.006 | | 7 } | | |
| 3. Starch plus sodium polyacrylate | 0.306 | 50:1 | | | 25 |
| 4. Starch | 0.3 | | 9 } | 10 | |
| 5. Sodium polyacrylate | 0.0015 | | 1 } | | |
| 6. Starch plus sodium polyacrylate | 0.3015 | 200:1 | | | 14 |
| 7. Starch | 0.003 | | 3 } | 12 | |
| 8. Sodium polyacrylate | 0.3 | | 9 } | | |
| 9. Starch plus sodium polyacrylate | 0.303 | 100:1 | | | 18 |
| 10. Starch | 0.3 | | 9 } | 14 | |
| 11. Sodium polyacrylate | 0.0045 | | 5 } | | |
| 12. Starch plus sodium polyacrylate | 0.3045 | 66:1 | | | 22 |

As is clearly evident from the above table, the combination treatment gives more than a mere additive result. Surprising increase of process efficiency in terms of vastly enhanced separation rates was noted in every instance.

A number of copolymers of acrylic acid or acrylic salts containing a variety of other comonomers were synthesized, and also tested in conjunction with starch for activity in promoting separation between the red mud insolubles and clear aluminate liquor. In each instance, excellent results were noted.

It was surprising to note that a wide variety of polymers other than the above-described materials, both addition-type and condensation polymers and interpolymers, had little or no activity in enhancing separation rate of red mud residue from aluminate liquor, whether employed to further benefit starch treatment or used alone. The following substance had no greater activity than a blank run involving no chemical addition, and in some instances the added polymer actually decreased the rate of separation of red mud impurities compared to blank runs. Blank runs involving no benefit of addition of the chemicals of the invention generally have a separation rate of less than 0.1 ft./hr. The following polymers exhibited about the same separation rate or even slowed down inherent separation of dispersed water-insoluble red mud impurities from liquid phase. A few of the unsuccessful polymers tested include polyvinyl alcohol, polyethylene oxide, polyacrylamide, polyvinyl pyrrolidone, polystyrene trimethyl ammonium hydroxide, polydimethyl aminoethyl methacrylate, copolymer of diallylamine and acrylamide, polyethylene imine, polyvinyl-toluene sulfonate, copolymer of polyvinyl pyrrolidone and vinyl alcohol, the bisulfite adduct of polyacrolein, copolymer of dimethylaminoethyl methacrylate and acrylamide, polyamines of varying polymer weights, polyquaternaries of various molecular weights, copolymer of 5% sodium acrylate and 95% acrylamide, 50–50 copolymer of sodium acrylate and acrylamide, and copolymer of vinyl methyl ether and maleic anhydride, and others.

It is understood, of course, that mixtures of different homopolymers, and copolymers, of the invention as defined above, may be employed with equal success. Likewise, other materials may be added along with the successful polymers. These auxiliary chemicals may be added as dispersing aids, extenders, anti-foamers, etc. It is preferred that both starch and the polymers and interpolymers of the invention be added in form of aqueous solutions in order to insure ready dissolution of the additive into the digester ore slurries.

By the term "polymer" as used herein is meant to include homopolymers, copolymers and interpolymers of acrylic acid or acrylate salts according to the previously defined limits of the invention.

The invention is hereby claimed as follows:

1. In the Bayer process of preparing alumina from bauxite which comprises the steps of digesting said bauxite in aqueous solution and at elevated temperatures with a strong base to solubilize the alumina, and separating said solubilized alumina from the water insoluble impurities of said bauxite, said impurities consisting of water insoluble residues remaining after the reaction between said bauxite and said base, which residues are commonly called red mud; the improvement which comprises effecting the separation of said red mud from said solubilized alumina and caustic solution at an increased rate and with increased efficiency by addition to the digested bauxite containing said solubilized alumina caustic solution and said impurities from about 0.1% to about 10% as based on the weight of said impurities of a composition comprising starch and a homopolymer, said homopolymer selected from the class consisting of polyacrylic acid and the salts thereof, said homopolymer having a molecular weight of at least 1,000,000 and less than 50% of the molecular weight of said homopolymer being derived from atoms existing in the branched state, said homopolymer containing at least 80% of re-occurring moieties selected from the group consisting of acrylic acid and salts thereof, said composition having a weight ratio of starch to said homopolymer as polyacrylic acid within the range of 2.65:1 to 196:1, said salts of polyacrylic acid selected from the class consisting of the alkali metal, alkaline earth metal, and ammonium salts.

2. The process of claim 1 wherein said homopolymer comprises the alkali metal salts of polyacrylic acid.

3. The process of claim 1 wherein said homopolymer comprises the sodium salt of polyacrylic acid.

References Cited

UNITED STATES PATENTS

| | | | |
|---|---|---|---|
| 3,023,162 | 2/1962 | Fordyce et al. | 210—54 |
| 3,418,237 | 12/1968 | Booth et al. | 210—54 |

HERBERT T. CARTER, Primary Examiner

U.S. Cl. X.R.

210—52, 54; 23—52